United States Patent [19]

Nelson et al.

[11] Patent Number: 4,595,818

[45] Date of Patent: Jun. 17, 1986

[54] EXTRANEOUS SIGNAL ISOLATION APPARATUS FOR METAL WORKING MACHINES

[75] Inventors: James A. Nelson, St. Francis; August C. Mingesz, Milwaukee, both of Wis.

[73] Assignee: C-R-O, Inc., Milwaukee, Wis.

[21] Appl. No.: 526,124

[22] Filed: Aug. 24, 1983

[51] Int. Cl.$^4$ ................................................ B23K 9/00
[52] U.S. Cl. ............................ 219/121 PV; 219/130.4
[58] Field of Search ................ 219/121 PV, 121 EU, 219/121 LU, 125.1, 130.01, 124.1, 124.34, 124.02, 130.4, 121 PW; 266/58, 69; 174/59, 115

[56] References Cited

U.S. PATENT DOCUMENTS

| | | | |
|---|---|---|---|
| 4,017,707 | 4/1977 | Brown et al. | 219/121 P |
| 4,151,395 | 4/1979 | Kushner et al. | 219/124.34 X |
| 4,156,125 | 5/1979 | Brown | 219/121 PV X |
| 4,255,643 | 3/1981 | Baltonz | 219/124.34 |
| 4,436,288 | 3/1984 | Kellogg et al. | 266/69 |

*Primary Examiner*—C. L. Albritton
*Assistant Examiner*—M. M. Lateef

*Attorney, Agent, or Firm*—Andrus, Sceales, Starke & Sawall

[57] ABSTRACT

A flame cutting apparatus includes a pair of longitudinally movable gantries and a connecting transverse bridge which mounts carriages with flame cutting torches including a plasma torch unit. A computer numerical controller is fixedly mounted adjacent to one gantry. Position sensors and operating devices are mounted on the bridge with a high frequency supply for igniting the plasma torch and supplemental electronic circuits. The bridge is a generally hollow box-beam having doors within which the supplemental electronic circuitry to mechanically and electronically isolate them. Cables are provided for connecting the bridge mounted sensors and operating devices to an onboard computer controller. A special filter unit is mounted in the controller-mounted gantry. The filter unit includes an enclosure and a plurality of separate filters each of which is connected to a lead of the cable. The filters isolate the controller from electronic noise and extraneous signals in the cables.

13 Claims, 3 Drawing Figures

EXTRANEOUS SIGNAL ISOLATION APPARATUS FOR METAL WORKING MACHINES

The present invention relates to extraneous signal isolation apparatus for metal working machines and particularly to thermal cutting machines incorporating ignition systems which create a high frequency signal source.

In cutting and working of metal, flame cutting systems and devices are widely used. For example, in cutting of metal plates, the plate may be supported in a horizontal plane within a cutting machine. One or more torches are movably mounted on the machine for traversing the plate and cutting of the plate. Various forms of cutting torches can be used, such as a conventional suitable oxygen and gas torch and the more recently developed plasma torch in which an electrical potential applied between torch and the work creates ionization of the gas and a high temperature cutting plasma flame. The plasma flame is initiated by an ignition gap located within the tip of the torch. Certain torches have the ignition gap connected to a suitable high frequency power supply and other torches have the gap connected to a capacitor discharge supply.

In modular production processes the torches are automatically programmed and controlled for movement over the plate to create the desired cutting. For example, U.S. Pat No. 4,255,643 to F. J. Balfanz on Mar. 10, 1981, discloses a satisfactory control system for positioning and moving of one or more torches over a fixed plate. The control systems preferably incorporates a computer-based controller. Suitable sensors monitor the position of the torches and a program uses such signals to continuously provide output control signals for positioning of the torches in accordance with a preprogrammed pattern.

The positioning sensors may use various types of encoding devices which produce an appropriate electrical signal proportional to and accurately identifying the location of the torch. Both digital and analog signal encoders and drive systems are commercially available and used. A digital encoder generates a train of pulse signals in accordance with the monitored position. The analog signal provides a continuously varying amplitude signal in accordance with the position of the torch. In addition, electrical power is of course supplied to the torches and to the drive systems. For example, with plasma torches the power supply to the torch includes the high frequency ignition supply or a discharge capacitor supply as well as cutting power supply. Such control and operating components are often mounted on the machine in close proximity to the appropriate controlled or controlling component. Further, such control and operating components are connected to the controller and operating components are connected to the controller through suitable electrical wiring cables.

Electronic logic controllers such as the widely used computer based controllers are very sensitive to extraneous high frequency signals which can cause serious malfunction if allowed to enter the computer based controller.

Flame cutting machines and similar machines which require cabling between controlled and controlling components mounted on the machine and particularly moving with the various moving components, create a source of extraneous signals. This is particularly true where the systems are required to conform to different customer specifications with the use of different equipment and components. For example, a customer may specify a particular torch which requires some special power or control wiring. Further, some users insist on an analog encoder while others insist on a digital encoder. The power leads also have been found to create a very significant source of extraneous signals. Further, the signals themselves within the several lines or leads may induce signals in other leads which can create malfunction within the computer based controller. Thus, the individual systems would therefore be carefully isolated to limit such a cross talk. This of course is particularly difficult with the wide variety of movements which may be required by the torches and particularly when there is a plurality of torches on the machine which are simultaneously being repositioned with a corresponding movement of the leads relative to each other. The design difficulty is further aggravated by the fact that the conditions may vary after installation and use. Thus, even though a machine may be completely constructed and tested in the plant without any malfunction, the same machine will often be found to malfunction upon installation because of extraneous or noise signals arising from an unanticipated or other source which was not disclosed. For example, with plasma torches, variations in the circuit may occur during use as a result of tip eroding and the like. Instances are known where the malfunctioning created such a severe problem that the machine was shut down and replaced with another system.

Various forms of plasma torches require different control systems for ignition. Torches are generally high powered units. Thus plasma torches normally operating at 460 volts and 600 amperes. Various drive motors are coupled to the torch for positioning of the torch. For example, the prior Balfanz patent discloses a very effective programmed control for moving one or more cutting or welding torches in any one of the three cartesian coordinates for positioning of the torch with respect to the plate. Each coordinate of course requires appropriate sensing signal leads and control signal leads for monitoring and completing the servo control systems. A commercially available plasma torch monitors and relies on the reflected pressure of the gas from the torch as the torch first approaches the plate before applying a high frequency current to the high frequency igniter. In other systems, the igniter is periodically pulse energized as the torch approaches the work such that the plasma is automatically established and created as the arc touches the plate. A plasma torch of course requires the usual controls such as arc-voltage, height sensing, remote amprage control and the like. Similarly, in other flame torch systems, various torch sensing systems are required to accurately control the position of the torch with respect to the work. In addition, the system will also monitor the cutting operation to insure that the plate is in position for cutting with respect to the torch. Automatic marking of the plate may be desirable. These and other forms of controls all complicate anticipation of the source of noise signals in the complex control system requiring relatively large substantial number of signals, control lines and operating lines interconnected between the controller and the several monitoring and operating components.

The problem of "noise" related malfunction has generally been solved on initial design such as special shield cabling, special enclosures and the like. Generally, all installations have demanded extended field installation and subsequent servicing to solve the problem of noise signals. Certain constructions have been suggested that the computer based controller be spaced from the machinery a substantial distance to minimize the coupling of noise into the computer based controller as such. Although this can be used in certain large installations, it is not a convenient construction for most applications. A partial solution to the noise problem can be provided as disclosed in the copending application of James D. Kellogg, et al, entitled Metal Machining Device With Control Circuit Isolation which was filed on Sept. 27, 1982 with Ser. No. 424,621 and is assigned to a common assignee herewith. As more fully disclosed in such application a transverse bridge is formed as a hollow boxed-beam in which various system components are mounted. A controller is secured to one end of the beam and the cabling is interconnected through the closed boxed-beam. The encoder which forms one particular source of noise is preferably located to the opposite end of the beam from the controller thereby maximizing the distance the noise signal must travel. The beam thus forms a hollow housing which serves to mechanically and electrically isolate the electronic circuitry in such a manner as to minimize the creation and the pick-up of noise signals and other extraneous signals, and thereby serves to minimize noise signal transmission to the computer-based logic controller. In a practical installation for a plasma torch, the torch high frequency power supply is mounted on the beam and coupled to the torch by a special shielded cable encased within an outer insulating sleeve to prevent contact and coupling to the sleeve. Although such significant structure produced an improvement, noise problems are encountered. A further practical solution which has been employed in a multiple plasma torch cutting machine is use of a special separator coupled to the plasma torch leads to mechanically separate them by a distance of two feet or more.

There therefor remains a great need for a simple, reliable and lost cost apparatus or system for minimizing the problems of extraneous signals in flame cutting machinery and other similar metal working machinery.

SUMMARY OF THE PRESENT INVENTION

The present invention is particularly directed to a simple, low cost and reliable noise isolation apparatus which is particularly applicable to flame cutting apparatus. Generally, in accordance with the teaching of the present invention, a noise isolating filter module is mounted immediately adjacent to the logic controller and each of the individual input-output leads which can create noise interference and other extraneous signal interference are interfaced to the logic controller through an individual filter unit. The inventors have discovered that the filter means with the individual filtering units particularly at the controller essentially completely eliminates malfunction as a result of extraneous signal generation. The modular construction particularly adapts the system to commercial implementaion for online production as well as retrofitting of the noise isolation unit to existing thermal cutting machines and the like. More particularly, in accordance with the teaching of the present invention, the thermal cutting machine is constructed the usual commercial construction such as a travel bridge supported by gantries as a travelling beam. The torches and associated components are mounted on the bridge. The computer-based logic controller is preferably mounted to one end of the bridge with the other components spaced along the bridge as required. The filter module is mounted to or adjacent to the controller. In one embodiment the isolating filter module is mounted to the end of the beam immediately adjacent to the controller and housed in a separate control box. For example, the controller is conveniently mounted to a box-like gantry such as shown in the previously identified co-pending application. The outer wall is provided with a suitable cover. The filter module includes a separate enclosure which is mounted within the gantry behind the cover. All of the circuit leads to and from the controller and to and from the several components are interconnected through the gantry housing. All leads including the power leads, sensor and, feedback leads, control leads and the like which can form a possible source of noise signal to the controller are to be connected to the controller through the filter module. The leads from the control and operating components are connected as one or more cable groups while the leads to and from the controller are located and connected as a second group to prevent transfer from the first group to the second. Each filter unit in a preferred construction consists of a series inductor and a capacitor to ground. The inductor creates a high impedance path to the sensitive circuitry while minimizing the feed-through impedance. The capacitive by-pass serves to conduct the noise signals to ground or other by-pass point.

The module can conveniently be formed as a printed circuit board with the necessary inductors and capacitors interconnected to the board and connected to similar end connections for in line connection to several leads. The unit is preferably potted to protect the units and permit use in various environments.

The present invention has thus been found to provide an extraneous signal isolation system for flame cutting machines having computer-based logic controllers having on-board memory and processors which move as a unit with the basic machine.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
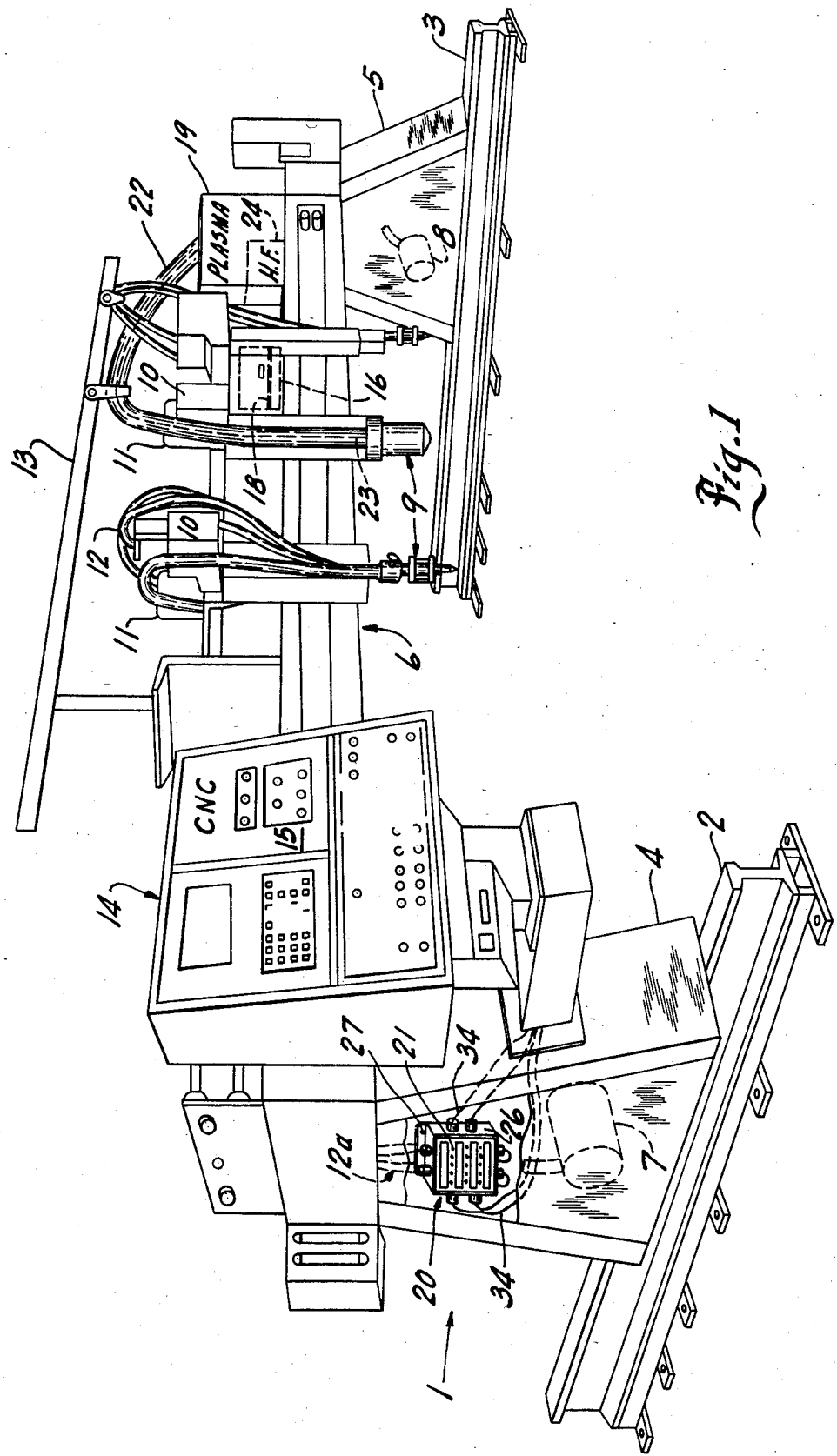
FIG. 1 is a perspective view of a thermal machine illustrating an embodiment of the invention.
Figure 2:
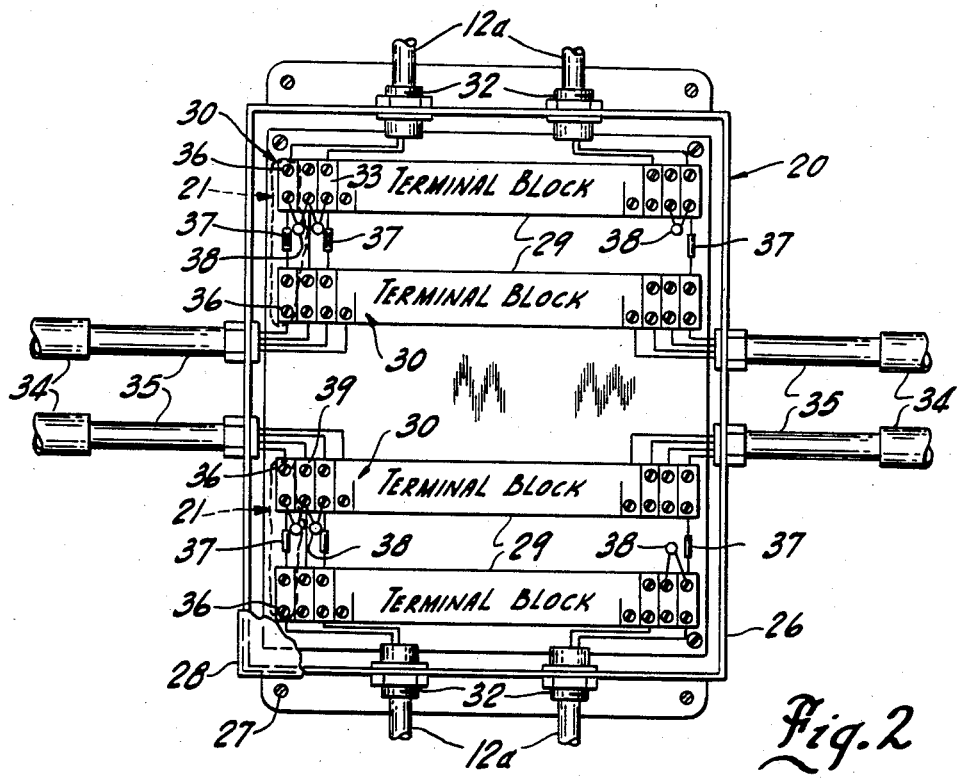
FIG. 2 is a fragmentary side elevation of the device, with parts removed for clarity, and more clearly showing the noise isolation module.

The illustrated embodiment is illustrated in the drawings applied to a flame or thermal cutting machine 1, such as more fully disclosed in the copending application of Kellogg, et al. The machine 1 is adapted to be mounted on a pair of longitudinal rails 2 and 3 which are secured to the floor. Support gantries 4 and 5 are mounted for movement along the respective rails, with the gantries supporting the ends of a transverse bridge 6 which extends over the machining areas.

Bridge 6 is adapted to be driven in a longitudinal direction by any suitable motive means, such as motors 7 and 8 which are mounted in grantries 4 and 5 drivingly connected to rails 2 and 3, as explained in greater detail in the aforementioned U.S. Pat. No. 4,255,643.

Likewise, one or more cutting torches 9, are shown and particularly including a plasma torch unit. The torches are suspended from carriages 10 adapted to be driven along bridge 6 as by motors 11 which are drivingly connected to the bridge. The heads are adapted to work and particularly thermally cut a horizontally disposed fixed metal workpiece, shown in phantom.

Torch units 9 are supplied with gas and electrical power through suitable input cables 12 including the necessary individual power and return leads. Similarly, the monitoring and positioning control systems includes cables 12a including the necessary individual sensor and command signal leads. The cables 12 and 12a may be at least partially supported in a festoon device.

Motors 7, 8, 11 and torch assemblies 9 are adapted to be primarily controlled from a logic controller 14 such as a known CNC, which is shown as a thin-walled primary control box fixedly mounted adjacent to one end of bridge 6, in this instance on gantry 4. The controller 14 contains a computer based control having a suitable computer and appropriate input and output connections for automatic control of the movement of one or more of the torches, numerous electronic circuits, as well as the usual front control panel 15 with actuator readouts and indicia thereon.

As is customary, box or enclosure of the logic controller 14 does not contain all of the electronics for the machine, there also being the need for supplemental electronic circuit on the machine bridge and components which are connected to the computer. As previously pointed out, at least some of these electronic circuits may radiate electronic "noise" which could interfere with the logic controller operation. Additionally, the power cables which are suitably connected through a power track, not shown, and the surrounding environment may be a source of noise signals, and one which may vary over the useful life of the machine.

As more fully disclosed in the above identified copending application, bridge 6 is preferably constructed to form a rigid enclosed elongated heavy-walled hollow box-beam housing having a plurality of normally closed doors 16, as disclosed in the co-pending application. Drawers, not shown, are designated to receive and hold secondary electronic circuits 18. The machine power and the plasma torch power are connected from suitable supplies to a machine power unit, not shown, in bridge 16 and to the plasma console unit 19 of any suitable construction through the conventional power track, not shown. The internal mounting minimize electronic coupling and antenna effects caused by the inconsistencies of manufacturing techniques, as more fully disclosed in the previously identified copending application. The box-like support structure is mounted for movement on the rails 2-3 with appropriate drive motors 7-8 for positioning of the structure over the work area. In addition, the several torches 9 are movable along the bridge as well as vertical to provide for desired movement within the work area in conjoint movement with the bridge structure 6 for essentially universal movement and positioning of the plasma torch 9. The position sensor may advantageously use an encoding device coupled to the torch positioning motor means. Such encoder may be of a digital variety producing a pulse train with a number of pulses proportional to the actual movement and therefore the position of the component. Alternatively, the device may employ an analog signal source with a continuously varying amplitude signal proportional to the actual position thereby providing a corresponding analog position related signal. In either event such signals are transmitted to the controller where the information is processed with respect to a predetermined desired movement with respect to time and position.

The various positioning and sensing devices and other components and particularly the high frequency generator on the machine as well as in the surrounding environment may create extraneous signals. Such signals may thus be generated directly within the cabling 12-12a or may be generated external to the cabling. External signals can of course induce or be coupled into the cable leads and generate a damaging adverse signal. Such signals coupled into the computer may create extraneous signals causing the computer logic to misinterpret the information or create other forms of malfunction within the computer or the logic controller as previously discussed. Although the spacing of the components is maximized various special shielding procedures have been developed and used continued problems are encountered particularly in the field. Such requirements are not only time consuming but costly. In accordance with the present invention, a special filter unit 20 is provided at the computer-based logic controller 14 and connected as an interface between the individual leads of the control and operating cables 12 and 12a and the logic controller 14. The filter unit 20 is designed to provide protection all groups of leads which may be a significant source of malfunctions.

The filter unit 20 includes a pluality of individual filters 21, each of which is connected in circuit with one lead to isolate such lead and prevent transfer of noise signals to the logic controller 14.

As noted previously, the invention is described with a plasma torch machine because of the special problems encountered. The plasma torches 9 are high power units normally operating at 460 volts and 600 amperes. Various drive sensor motors are coupled to the torch for positioning of the torches in a cartisian system; for example, as shown in the prior Balfanz patent. Each coordinate of course requires appropriate sensing signal leads and control signal leads for completing of the servo control system for that axis.

The plasma torch 9 includes a torch lead set 22 for supplying of cutting gas to the torch 9. The torch lead 22 is generally of a conventional construction which includes the usual gas and water hoses, the supply and exit water cooling tubes as well as the power and ignition leads passing through the cooling tubes which are encased with an outer plastic sheath or shell to form a flexible lead set. In addition, such lead set 22 is preferably provided with an outer conductive shield braided and an outermost insulation sleeve. As such lead set 22 is standard except for the outer shield and sleeve, a power lead 23 is diagrammatically shown and no detailed illustration or description is given. The initiation of the plasma is created by arc ignitor, not shown, which is connected to the power cable and to a ground lead as a part of tube 22 to a high frequency source or a capacitor discharge unit as a part of the conventional console 19 which establishes a momentary high frequency or capacitor discharge current to the ignitor for initiating the arc and plasma. Once the plasma is established, the ignitor current is stopped and the main power supply maintains the arc thereby controlling the cutting plasma.

The plasma console with the ignition current source is mounted on the bridge at the end opposite to the logic controller. The connecting cables 23 are a flexible cable permitting the movement of the torch along the bridge 6 relative to the fixed mounting of the high frequency source 24. The ignition source of course can be a significant source of extraneous signals. Thus, the ignition supply is a source of high frequency signals which if impressed on the controller can cause malfunction. Thus, the capacitor discharge system generates a preload signal which includes high frequency improvements. The cable 23 and tube 23 has therefore generally been specially constructed as a shielded cable. In view of the relative movement of the componsnents and the like, the shielded torch lead set 22 in turn is provided with an outer insulating cover to isolate the lead. Such precautionary measures are advantageous in the past to minimize the creation and supply of high frequency extraneous signals into the electical system which can significantly adversely affect the operation of an electronic logic controller. Even with such extreme precautions, the inventor has found that the high frequency source continues to constitute a significant source of noise or extraneous signals into the control.

More particularly, the gantry 4 is a boxed-like member of a generally trapazoidal configuration. The gantry is formed of appropriate stamped metal with the several walls welded or otherwise rigidly interconnected to define the side structural support.

In the illustrated embodiment of the invention, the filter unit 20 is mounted within the end gantry 4 immediately adajcent the logic controller 14. The side wall of the gantry 4 is formed with an exterior door or cover permitting access thereto. The several cables 12a from and to torches 9 and to the operating and control components mounted on the bridge 6 terminates within the gantry 4. The filter unit 20 includes a separate enclosure 26 which is secured to the inner wall of the gantry 4 as by releasable mounting bolts 27. The enclosure 26 includes an outer cover 28 which is similarly interconnected to the enclosure by a suitable releasably bolts or the like. Within the enclosure, the filter unit 20 includes the plurality of filters 21 mounted in side-by-side relation in a plurality of rows. Terminal units 29 extend one each to opposite sides of each row of filters 21 with individual terminals 30 aligned with the filter. The incoming cables 12a from the bridge are connected to the enclosure sides as at 32 and the individual leads are connected to an adjacent terminal 33 of unit 29. The corresponding cables 34 from the controller 14 are connected to a different side of the enclosure as at 35 and the individual leads are connected to the terminal 36 of the adjacent terminal unit 29 on the opposite side of the row of filters 21. Each individual filter 21 includes an inductor 37 and a capacitor 38. The inductor 37 is connected between the aligned terminals 33 and 36 for series connection with the corresponding leads from the bridge cable 12a and the controller cable 34. The capacitor 38 is connected to the inductor terminal 33 of the bridge cable terminal unit 29 and to a grounded terminal 39 thereon to by-pass the noise signal. The filter unit 20 is connected with a sufficient number of filters 21 for accommodating the particular capacity of the machine and the particular groups of leads to be protected. For example, a machine including digital encoders generally requires a lesser number of interconnections into the computer systems.

Figure 3:
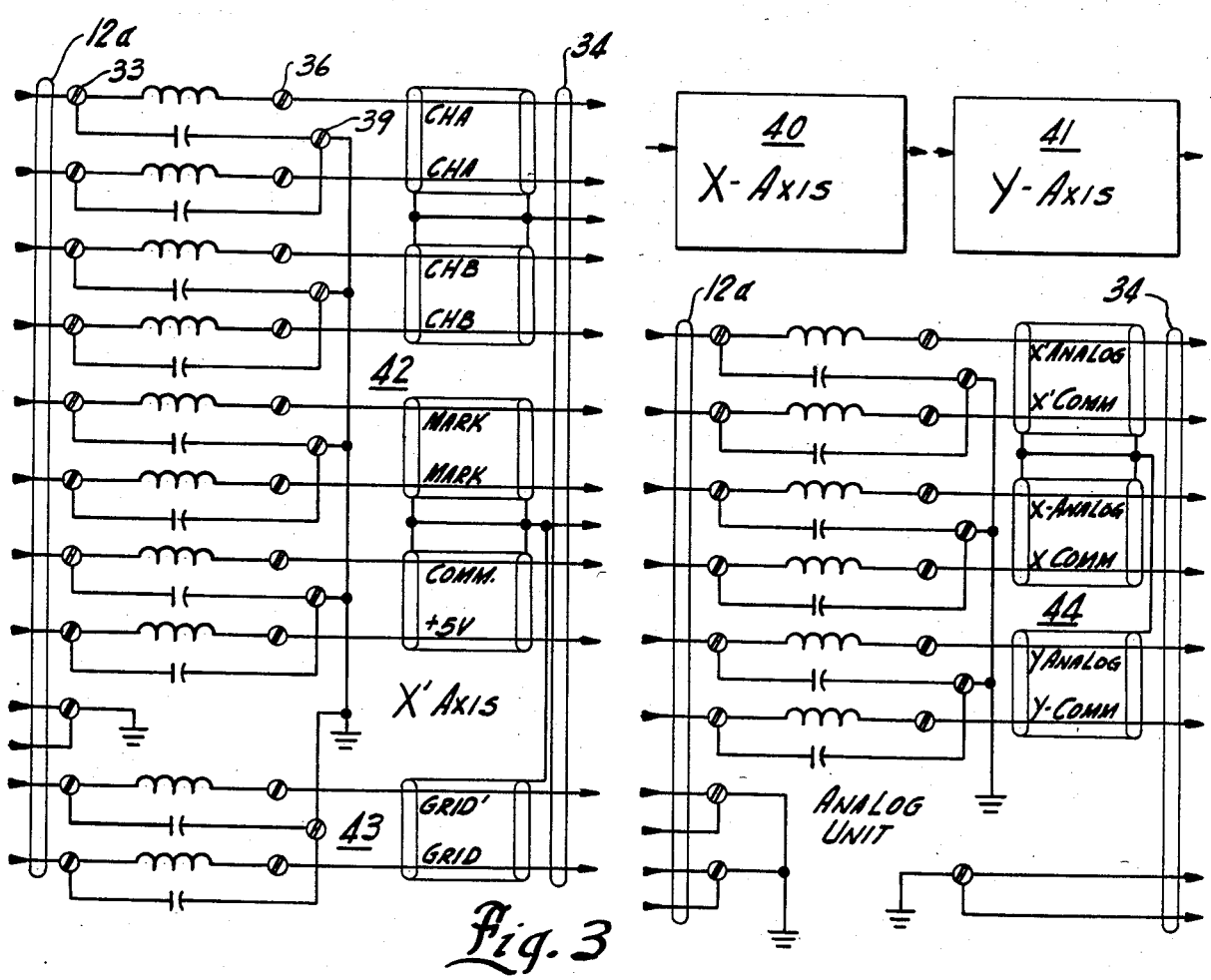
FIG. 3 is a schematic circuit illustration showing a typical application of the invention.

As more clearly shown in the schematic circuit of FIG. 3, the filter unit 20 for the analog circuit logic controller is shown. Referring to the Z or X' axis, each filter 21 is specially constructed and consists of the series inductor 37 connected between the cable leads terminal 33 and the controller lead terminal 36 of the logic controller 14. In addition, capacitor 38 is connected between the cable lead terminal 33 connection and the ground 39 or other suitable by-pass path. The series inductor 37 and bypass capacitor 38 are selected to readily pass all of the control information and operating signals while bypassing all of the extraneous high frequency signals. Thus, the inductor 37 is selected to provide a high impedance path to the extraneous signals while providing a relative low impedance feed through of the information signals. Similarly, the capacitor 38 defines a low impedance to ground for the high frequency signals while preventing passage of the information signals. Thus each filter 21 is selected with appropriate filtering range and with relatively sharp cut-off to provide maximum isolation of the extraneous signals while readily passing of all of the information signals.

In the embodiment shown in FIG. 3, the filter unit 20 is schematically illustrated for the analog output and digital encoded logic ciruit. Thus the x, y and x' or z axis signals are similarly coupled into the controller and require the bank of individual filters groups as shown respectively at 40, 41 and 42. The circuit for the x'—axis is shown in detail with the corresponding x and y axis circuit shown in block diagram. In addition a limit switch unit 43 is shown with the x'—axis group and an analog signal unit 44 is shown in detail. In each instance each of the individual signal, and control lines which are coupled to the controller have the individual protective filter units.

The illustrated unit is essentially universally applicable to analog type controls employed in the art, has been particularly applied to the systems disclosed in the Balfanz U.S. Pat. No. 4,255,643. Each inductor had an inductance of 100 millihenrys and each capacitor had a capacitance of 0.01 microfarads.

Various modes of carrying out the invention are contemplated as being within the scope of the following claims particularly pointing out and distinctly claiming the the subject matter which is regarded as the invention.

We claim:

1. A flame cutting machine having a torch support unit carrying at least one plasma torch means including a high frequency igniter and operational components for positoning the torch means and for monitoring the position of the torch means and having an electronic logic controller support unit and having multi-lead cables connected between the torch means and the controller, the improvement in the connection of the controller to the torch means and the operational components comprising a pluraliy of individual filter units connected in the individual leads of said multi-lead cables, said filter units being connected at the logic controller to isolate the controller from extraneous electrical signals in said cable.

2. The flame cutting machine of claim 1 including a filter enclosure having a mounting means for releasably affixing the enclosure to the support unit, said filter units being mounted wihin said enclosure in a spaced side-by-side relation with terminal means within the enclosure.

3. The flame cutting apparatus of claim 1 wherein each of said filter units includes a series inductor defining a high impedance path to said extraneous signals and a by-pass capacitor to ground defining a low impedance path to said extraneous signals.

4. The flame cutting apparatus of claim 3 wherein said inductor has an induction of substantially 100 microhenries and said capacitor has a capacitance of substantially 0.01 microfarads.

5. A flame cutting apparatus having a computer based control means for moving a torch supporting means over a work area and for conjoint moving at least one plasma torch on said supporting means, comprising a computer based control means, a plurality of operating means for driving said torch supporting means and said torch and for energizing said torch, a plurality of sensor means for monitoring the state and position of said operating means and torch, a high frequency torch ignition means, individual electrical leads fixed to said torch supporting means and connected between said control means and said operating means and said sensor means, said torch supporting means including a control support means for supporting the computer based control means, whereby said control means is carried by said torch support means, a filter module means comprising a plurality of individual L-C filter units connected to said individual electrical leads and including a series connected inductor and by-pass capacitor from the lead to ground, and means to affix the filter module means to said torch supporting means at said control support means whereby extraneous signals on said leads are isolated from said control means.

6. A metal working machine having a computer-based logic control means for moving a tool supporting means over a work area and for conjoint moving at least one tool on said supporting means, comprising a plurality of operating means for driving said tool supporting means and said tool and for energizing said tool and a plurality of sensor means for monitoring the state and position of said driving means and tool and including high frequency means, electrical cable fixed to said tool supporting means and having individual leads connected between said control means and said operating means and said sensor means, said control means being mounted on said tool supporting means, a filter means connected to the individual leads of said cable at said control means, and means to affix the filter means to said tool supporting means at said control means whereby extraneous signals on said leads are isolated from said control means, said filter means including a series connected inductor and by-pass capacitor from the lead to ground.

7. The machine of claim 6 wherein at least one tool includes a high frequency control and a high frequency source mounted on said tool support means, said source generating high frequency nose signals having said multi-lead cables.

8. The machine of claim 6 wherein said filter means includes a plurality of individual filter units connected in the individual leads of said multi-lead cable, said filter units being connected at the control means to isolate the controller from extraneous electrical signals in said cable.

9. The machine of claim 8 having a filter enclosure secured to the tool supporting means, said filter units being mounted within said enclosure in a spaced side-by-side relation with connection means to the opposite sides of the enclosure.

10. The machine of claim 9 wherein each of said filter units includes a series inductor defining a high impedence path to said extraneous signals and a by-pass capacitor to ground defining a low impedance path to said extraneous signals.

11. A thermal cutting apparatus comprising a torch support having a bridge and first and second end gantries, for moving the bridge over a work area, a plurality of torch carries on said bridge, operating means for driving said torch support over said work area and said torches along said bridge and for energizing said torches, a plurality of sensor means for monitoring the state and position of said operating means and torches and including a torch ignition means resulting in generation of a high frequency signal, said operating means and sensor means being mounted on said bridge and gantries and including auxiliary electronic equipment, a controller connected to said torch support at said first gantry, individual electrical leads fixed to said bridge and terminating in said first gantry and connected to said controller and to said operating means and said sensor means, a filter module mounted at the controller, said filter module including an enclosure and a plurality of individual filter units mounted in said enclosure and having terminal connectors, said individual leads being connected to said connectors and in series with a filter unit whereby extraneous signals on said load are isolated from said control means.

12. The thermal cutting machine of claim 11 wherein said filter module means is mounted in said first gantry, said enclosure having the leads from the torches and operating means connected to one side of the enclosure and the leads from the controller connected to a different side of the enclosure.

13. The thermal cutting machine of claim 11 wherein each filter unit includes a series inductor and by-pass capacitor connected to a ground terminal.

* * * * *